United States Patent [19]

Sherman et al.

[11] Patent Number: 5,799,193
[45] Date of Patent: Aug. 25, 1998

[54] SCENARIO BASED ITERATIVE METHOD FOR DEVELOPMENT OF AN OBJECT ORIENTED SYSTEM MODEL

[75] Inventors: William Sherman, Belle Mead, N.J.; Wen-Pao Liao, Staten Island, N.Y.

[73] Assignee: Siemens Corporate Research, Inc., Princeton, N.J.

[21] Appl. No.: 639,395

[22] Filed: Apr. 29, 1996

[51] Int. Cl.⁶ .................................................. G06F 9/44
[52] U.S. Cl. .......................... 395/703; 395/701; 395/702; 395/967; 395/712
[58] Field of Search ................... 395/701, 702, 703, 712, 710; 345/967, 949, 952

[56] References Cited

U.S. PATENT DOCUMENTS

| | | | |
|---|---|---|---|
| 5,247,651 | 9/1993 | Clarisse | 395/500 |
| 5,499,180 | 3/1996 | Ammirato et al. | 364/419.1 |
| 5,500,881 | 3/1996 | Levin et al. | 395/700 |
| 5,560,012 | 9/1996 | Ryu et al. | 395/700 |
| 5,671,415 | 9/1997 | Hossain | 395/701 |
| 5,721,926 | 2/1998 | Tamura | 395/701 |

OTHER PUBLICATIONS

"Scenario–Driven Software Design", Sherman et al., Electronic Design, Oct. 24, 1995, pp. 67–79.

*Primary Examiner*—Emanuel Todd Voeltz
*Assistant Examiner*—Kakali Chaki
*Attorney, Agent, or Firm*—Donald B. Paschburg

[57] ABSTRACT

A scenario based method is disclosed for updating an object oriented system model, which is implemented on a computer including memory. The method includes loading a partial system model into the memory. Loading a plurality of scenarios into the memory which defines the desired behavior to be added to the model. Then saving the plurality of scenarios. Producing a difference summary including the differences between the system model and the plurality of scenarios, which enables a user to select an update set of scenarios. Updating the model by extracting class, method and state transition information from said update set of scenarios.

14 Claims, 2 Drawing Sheets

SCENARIO BASED ITERATIVE METHOD FOR DEVELOPMENT OF AN OBJECT ORIENTED SYSTEM MODEL

RELATED APPLICATIONS

The Assignee herein, Siemens Corporation, is the record owner of copending U.S. application Ser. No. 08/423,909 to Sherman et al., entitled METHOD FOR ANIMATING COMPOSITE BEHAVIOR OF SCENARIOS, filed Apr. 18, 1995 and U.S. application Ser. No. 08/423,919 to Sherman et al., entitled SCENARIO PRESENTATION TOOL, filed Apr. 18, 1995 now abandoned.

BACKGROUND OF THE INVENTION

1. Field of the Invention

The present invention relates generally to a software development tool and more particularly, to a scenario based iterative method for developing object oriented system models.

2. Description of the Prior Art

The early phases of software system design are generally performed by a team of analysts who depend on their abstraction and communication skills to perform the tasks of specifying the requirements of the proposed system and representing these requirements in textual descriptions and diagrams. Typically, such analysts will have to reach a consensus among themselves that their design approach will meet the requirements. Next, the analysts must describe to the customer their proposed solution to the problem. Once agreement has been reached that the proposed design will satisfy the customer's needs, the proposed design must be communicated to a larger team with responsibility for the system implementation.

The task of generating and reviewing large software system design specifications can be an inefficient use of design time since the documents that are produced are often too complex to be readily comprehensible. The participants in a design review are typically expected to have read and thoroughly understood the specifications. In a typical working environment, such an expectation is usually unreasonable for large design specifications as most projects are limited by tight schedules. Many of the reviewers will not be able to allocate sufficient time to the review of large design specifications. Design reviewers often concentrate only on the areas of their particular interest, and they may fail to see the overall picture or design defects in other areas of the design.

In a typical prior art approach, software engineering staff in a research laboratory may be called in to support design reviews of a new product being developed by a company. Such a product may readily contain 150,00 to 200,000 (150k to 200k) lines of code, for example, of C code, when implemented. The project design team may use a commercially available tool such as Cadre Teamwork to illustrate the dataflows for the design. Typically, a large stack of dataflow diagrams is then printed and inserted into design notebooks, and projector slides such as view graphs are made for the design review meetings. Such a stack of diagrams can become very thick and, in the interest of practical convenience, designers would accordingly generally present only important components of the design to the review teams. For example, an approach used for review meetings might be to define scenarios of important product functions, and then "walk through" the annotated dataflow diagrams to illustrate the sequential behavior of the design model. It is herein recognized that this approach has value both for designing and reviewing the designs of complex software systems. It also herein recognized that automated support for defining scenarios and "walking through" design documentation is desirable.

In order to build a software system, it is necessary to first describe the system requirements. The requirements are usually described in text that may be ambiguous and misleading. Analysis of the requirements results in a more precise system description that can be represented in many forms, such as dataflow diagrams, pseudo-code, sequence charts, and so on.

Thus, scenarios are useful early in the software design process for specifying what the designer wants the system to do. Scenario are sequences of transition and activity which specify the desired system behavior. Their advantage is that valuable illustrations of the working system can be developed quickly. The dynamic behavior is often the most important aspect of a system being developed. However, many software development methods focus the designer's attention on the system structure or architecture. Since the structure is emphasized first, more effort is expended in this area and correspondingly less effort is put into the analysis of the dynamic behavior. It is important to view the design from three perspectives which include structure, data, and behavior. The emphasis will vary based on the nature of the system being designed, but it is important that all three be considered.

A more productive approach can involve the reviewing of a smaller set of key design diagrams accompanied by a set of important scenarios. The scenarios are used to "walk through" the design for review or "shake-out". These scenarios can then become a useful form of documentation throughout the life of the project. Although a number of development organizations are currently defining scenarios, there is limited computer aided software engineering (CASE) tool support for these efforts. In addition, many development organizations could improve their designs by taking more advantage of scenarios in the early phases of systems development.

Scenarios can be used for describing and communicating a system design for review purposes. Since people tend to describe how things work in terms of scenarios, it is useful to capture these scenarios and make them part of the software development methodology.

The scenarios focus attention on a particular behavior or function thread of the system and they provide an alternative to trying to imagine and mentally juggle the complex interactions of the entire system at once. CASE tools provide the capability to model a large problem by means of decomposition and abstraction. Scenarios are slices of the system behavior which can be considered one at a time in terms of the system model.

Scenarios have wide appeal because of the many benefits obtained over the life of a software development project for minimal investment. In the early stages of a project, scenarios have the ability to bring a design to life and illustrate what the designers have created. Verification that all the system requirements have been covered is facilitated using scenarios. Software systems designs can become better documented, thereby relieving experienced design personnel from having to explain all of the details of a design to reviewers, coders, testers, maintainers, and customers as they become involved with a project in later stages of development and delivery.

In the design process scenarios are utilized to provide valuable information about the desired behavior of a software system. In such an application, an object model of the system may be created directly from the definition of the scenarios. Although, this seems to provide a complete definition of the required system behavior, it is very difficult (or impossible) to completely define the behavior of a system by elaborating "all" of the scenarios. This is because more scenarios can always be produced than the ones initially expressed simply by making trivial modifications. In fact, there is no need to exhaustively define all of the scenarios for a particular system. The collection of scenarios that are developed provide at best, an incomplete model of the control element of a system. The incomplete model is then examined and augmented in a round of design reviews.

An important aspect of scenario based object oriented design, is to define the Finite State Machine (FSM) from a minimal set of scenarios. The use of a scenario driven technique facilitates the creation of the FSM transition tables. In object oriented design, the usual practice is to create the FSMs without any guidance. In contrast, the scenario driven technique provides a method for a user to follow.

Therefore, it is an object of the present invention, to provide a method to iteratively improve an object model by utilizing a scenario driven technique.

SUMMARY OF THE INVENTION

A scenario based method is disclosed for updating an object oriented system model, which is implemented on a computer including memory. The method includes loading a partial system model into the memory. Loading a plurality of scenarios into the memory which defines the desired behavior to be added to the model. Then saving the plurality of scenarios. Producing a difference summary including the differences between the system model and the plurality of scenarios, which enables a user to select an update set of scenarios. Updating the model by extracting class, method and state transition information from said update set of scenarios.

The method further includes post processing and generating code for the updated model automatically.

BRIEF DESCRIPTION OF THE DRAWINGS

The above objects, further features and advantages of the present invention are described in detail below in conjunction with the drawings, of which.

DETAILED DESCRIPTION OF THE DRAWINGS

Figure 1:
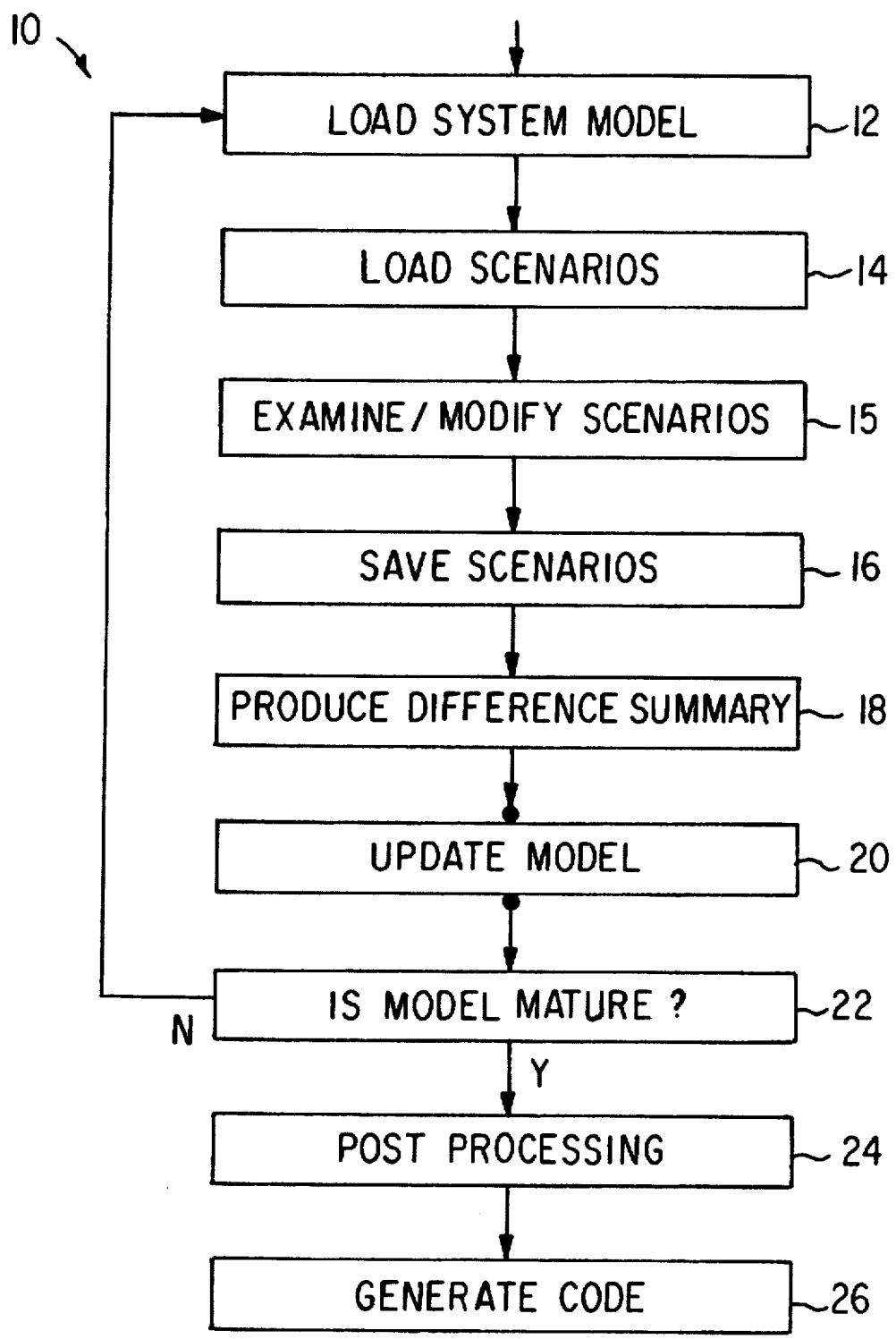
FIG. 1 is a flow diagram of the method for developing an object oriented system model according to the present invention.

The use of scenarios in software design is well known and for example is discussed in article written by Sherman et al, entitled SCENARIO-DRIVEN SOFTWARE DESIGN, Electronic Design, Oct. 24, 1995, Pgs. 67–80.

A further discussion relating to scenario driven software design is disclosed in copending U.S. application Ser. No. 08/423,909, entitled METHOD FOR ANIMATING COMPOSITE BEHAVIOR OF SCENARIOS and U.S. application Ser. No. 08/423,919, entitled SCENARIO PRESENTATION TOOL, both disclosures of which are herein incorporated by reference. Each application includes various charts and flow diagrams which help explain the details of each disclosure.

In particular, U.S. application Ser. No. 08/423,919 discloses a scenario presentation tool that provides for the definition, maintenance and presentation of scenarios. The tool utilizes a system description that includes arrangements for reading and presenting the system description, and for facilitating the definition, maintenance and presentation of scenarios.

In particular, U.S. application Ser. No. 08/423,909 discloses a method for animating a composite behavior of scenarios in association with a scenario presentation tool. The method includes defining a sequence of steps by selecting elements from the system description in accordance with a predetermined sequence, saving the sequence of steps with sufficient information to reproduce the scenarios, constructing an object communication diagram and saving the diagram.

A scenario generally is defined as a sequence of steps. Scenarios also include a title, description, and associated requirements. The description is typically a summary of what function thread is being illustrated along with some context setting information and possibly an initial state.

Each step of a scenario includes a source node, a directed flow, and a destination node. The flow conveys a message or a value from the source to the destination. A step may have a description and state change information associated with it. The state indicates the name of the system, subsystem, or object state following the completion of that step.

A node can be a process bubble, a terminal, a data store, a control element, or an off page reference. Off page references are connections to the parent level diagram. For object oriented system designs, nodes are the objects.

The present invention is directed to a scenario based method for developing object oriented system models. Scenarios provide valuable information about the desired behavior of a system. Each scenario is a fragment of the required behavior at a particular level of abstraction. When a collection of scenarios has been created, it becomes possible to derive many benefits from the embedded information.

The present invention requires the construction of an object model. The model is either provided partially completed by the user at the outset or is created directly from the definition of the scenarios. In either case, according to the present invention the model is iteratively refined and improved during the course of further scenario driven development. A unique advantage derived from applying scenario driven analysis relates to the direct transcription of state transitions for each class of the model from the behavior description expressed in the scenarios.

The model is ultimately the collection of information which is required to define the behaviors specified in the scenarios. This information includes classes, methods (events), states and transitions.

Methods are the services provided by each of the classes. While the states and transitions for a class define the Finite State Machine (FSM) which describes the behavior of that particular class. However, it should be noted that not all of the classes of the model will include state transition information. Only the classes that exhibit interesting behavior include a FSM.

In object oriented design, in order to invoke a service (execute a method), an object sends a message (calls a method) to the object providing the service. The concept of sending a message is further abstracted to the FSM term event. Thus, the incoming message (event) causes the method to execute, thereby providing the service that was requested. An important aspect of the above described sequence, is that prior to or during the course of executing the method, the state of the object is changed. The next state of the object is determined in accordance with the current state of the object and the incoming event.

Although, the above technique seems to provide a complete definition of the required system behavior, it is very difficult to completely define the behavior of a system by elaborating all of the scenarios. This is because it is always possible to produce more scenarios than the ones originally expressed. In fact, there is no need to exhaustively define all of the scenarios for a particular system. The collection of scenarios that are developed provide at best, a partial model of the control element of a system. The partial model is then examined and augmented in a round of design reviews.

An important aspect of scenario driven object oriented design, is to define the FSM from a minimal set of scenarios. The use of a scenario driven technique facilitates the creation of the FSM transition table. In object oriented design, the usual practice is to create the FSM without any guidance. In contrast, the scenario driven technique provides a method for a user to follow. At any time, a user verifies if all the states for a class are covered. If all of the states are covered, then the next question is whether all of the events are expressed. If all of the events are expressed, the FSM is ready for direct scrutiny by the system analyst or final reviews by the team. Any box in the state transition matrix that is missing transitions must be considered for its particular behavior. An editor is utilized to manually fill in "don't care" situations or "can't happen" situations. If a state is missing, then a scenario must be created that contains that state. The same applies to methods that have not been invoked in the collection of scenarios. Simply create one or more scenarios which contain that particular method.

The definition of a state transition table is the basis for achieving predictable behavior in a system. Upon agreement that the state transition table is complete and correct, the next step is to reproduce the defined behavior in software. A number of conventional approaches are available, which include table driven, single control driver program or multiple control driver programs. However, if a specification of the required control is presented to a group of programmers, there is no guarantee that a correct implementation is produced. Thus, it is preferable that the state transition table be implemented by automatic code generation. When all of the desired behavior is specified, the FSM is constructed automatically in any source code desired. Such an approach offers an output that is repeatable and correct. Maintenance of the program control is achieved through the correction of the specification (FSM) and another round of automatic code generation. The method of the present invention requires an object model that is self consistent. This means that the model cannot contain any references to elements which are not defined in the model. If such an inconsistent model is loaded, the method of the present invention is configured to provide a summary of warnings.

However, the method of the present invention does not require the scenarios to be consistent with the model. When a scenario is loaded, it may contain elements such as classes, methods, states or transitions, which are not in the model. These missing elements must be added to the working copy of the model in memory with an indication that these elements are not in the saved model. The user is then given the option of updating the saved model with the missing information completely or selectively. When a scenario is being created, the user is warned when the scenario deviates from or conflicts with the behavior defined in the system model. This occurs when new steps are defined or when editing of the scenario is performed. In addition, the user may define new elements as part of the scenario which are not defined in the model. These elements are selectively added to the model under control of the user.

Referring to FIG. 1, there is shown a flow diagram of the method for developing object oriented system models according to the present invention. The method 10 develops a system model by iteratively updating an pre-existing partial model, wherein during each iteration additional elements are incorporated into the model or other modifications are made. The method 10 is implemented on a computer or work station that is capable of supporting object oriented design.

The method 10 first loads a system model 12 into the memory of the computer or workstation implementing the method 10. As previously discussed the system model is an object oriented system model that is either provided partially completed by the user at the outset or is created directly from the definition of the scenarios. Also as previously discussed, the system model is required to be self consistent, which means that the model cannot contain any references to elements which are not defined in the model.

Then scenarios are loaded 14 into the memory of the computer or work station. As previously discussed, scenarios are sequences of transition and activity which specify a portion of the desired system behavior. Thus, the scenarios loaded 14 define portions of the system behavior that the user desires to be added to the system model. The scenarios loaded 14 can include pre-existing scenarios or newly created scenarios. Then the scenarios are examined and modified 15 which is also known as reviewing scenarios. In this step, pre-existing scenarios can be modified so that the desired behavior is incorporated into the system model.

Next scenarios are saved 16 which were previously loaded into memory. After saving the scenarios, the method 10 then produces a difference summary 18. The difference summary includes a list of all the differences between the scenarios and the model. The differences consist of class types, methods, states and transitions included in the scenarios which are not contained in the model. The difference summary is produced by comparing the scenarios to the model in memory.

The difference summary is utilized by the user in order to choose which of the previously loaded scenarios are used to update the system model. Very often the user determines that a particular scenario contains candidates for updating or differences which should not be included in the model. Thus, as a result of reviewing the difference summary, the user selects a set of scenarios which contain all of the differences the user wants included in the model.

The method 10 then updates the model 20 with the set of scenarios chosen by the user. The updating is preferably performed by extracting class, method and state transition information simultaneously from all of the scenarios in a step by step manner, which will be described in detail in conjunction with FIG. 2.

Still Referring to FIG. 1, after updating the model 22, the method 10 then advances and enables a user to determine if the model is mature 22. In this step, the user determines if the model is at a proper level of maturity. If the user determines the model is not mature, the method 10 loops back and again performs steps 12–22 again, whereby the model is iteratively updated by an additional set of scenarios which are chosen by the user. This loop is repeated until the user determines the model is at an adequate level of maturity.

At the point where the user determines the model is mature, the method 10 then performs post processing 24 on the model which was previously updated. The post processing 24 may include reconciling multiple class behaviors, editing and consistency checking, and model merging.

Reconciling multiple class behaviors involves combining the multiple instances of a single class into a single composite state machine. The multiple instances of a class are utilized in the scenarios when a class has more than one behavior of interest. The user may choose to build the model keeping the behaviors separate from each other or combining the behaviors into a single FSM for that class. Separating the behavior by a named instance may provide additional insight for the user. Combining the multiple class behaviors does not have to be performed after updating the model 20, it may performed at some other point in the method 10. Editing and consistency checking involves seeing if all of the transition tables of the classes having interesting behavior are complete and correct. Very often the state transition tables of the model at this point in the method 10 are still only partially completed. If this is true, the transition tables are completed by filling in "don't care" or "can't happen" situations within the tables.

Merging models involves combining the updated model with any other model that may be stored. This enables a user to reuse a portion of a system which was previously designed.

After post processing 24, the method 10 then generates code 26 for the model. This step includes generating state machine code for each class of the state transition table, which produces an updated system model. The code generated is preferably performed automatically by code templates that may embody some form of case statement to act as a dispatcher, for example.

Figure 2:
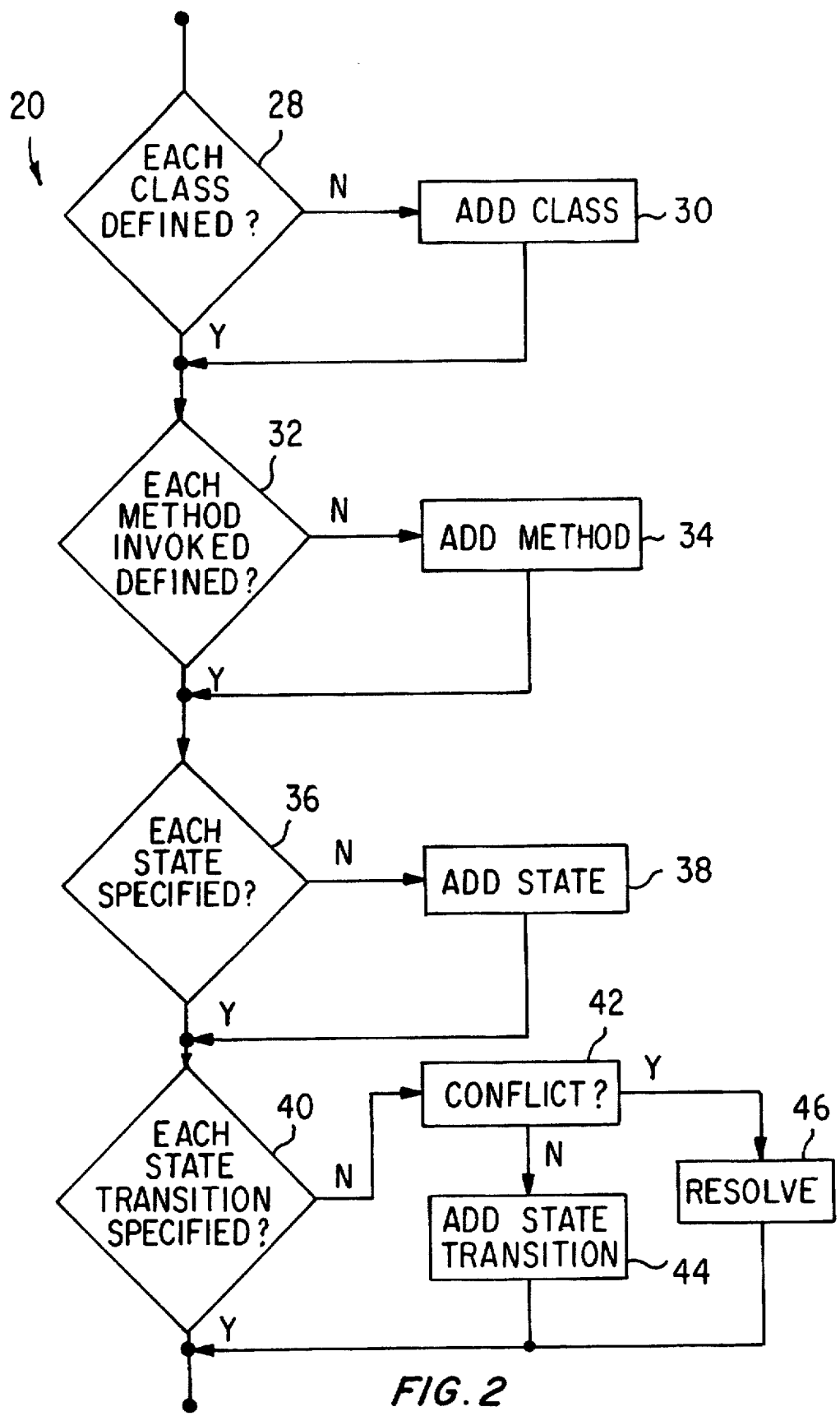
FIG. 2 is a flow diagram for the method of updating an object oriented system model according to the present invention.

Referring to FIG. 2, a flow diagram for the method of updating the system model according to the present invention is shown. The method 20 includes verifying that all of the nodes of the scenarios are defined as classes 28 in the model. This involves verifying that both the source and destination nodes of each scenario step is defined as a class within the model. If one or both nodes are missing for a particular scenario step, then the corresponding class is added 30 to the model.

The method 20 then verifies that each method invoked is defined 32 in the model. This involves verifying that the method invoked on the destination node of each scenario step is defined in the model. If any of the methods invoked are missing, then the missing methods are then added 34 to the model.

The method 20 further verifies that each state is specified 36 in the model. This involves verifying that all of the states of the nodes contained in the scenarios have corresponding states in the state transition tables of the model. If any of the states are missing, then the missing states are added 38 to the model.

The method 20 finally verifies that each state transition is specified 40. This involves testing for the existence of a state transition from the current state of the destination to the next state specified in each scenario. If such a transition is missing, the method 20 then verifies if there is a conflict 42 between the missing state and an existing transition within the model. Verifying whether there is a conflict 42 is necessary because an object model is required to contain only one transition from a given state for a given event. If there is no conflict, the missing state transition is added 44. If there is a conflict, it must be manually resolved 46 by the user.

While the invention has been particularly shown and described with reference to preferred embodiments thereof, it will be understood by those skilled in the art that changes in form and details may be made therein without departing from the spirit and scope of the present invention.

What is claimed is:

1. A scenario based method for updating an object system model which is implemented on a computer including memory, said method comprising the steps of:

loading a partial system model into the memory;

loading a plurality of scenarios into the memory which defines the desired behavior to be added to said partial model;

saving said plurality of scenarios;

producing a difference summary including the differences between said partial model and said plurality of scenarios, which enables a user to select an update set of scenarios; and updating said partial model producing an updated model by extracting class, method and state transition information from said update set of scenarios.

2. The method of claim 1, wherein said loading plurality of scenarios includes reviewing pre-existing scenarios.

3. The method of claim 1, wherein said difference summary is produced by comparing said plurality of scenarios to said partial model.

4. The method of claim 1, wherein said extracting class, method and state transition information is performed simultaneously on said update set of scenarios.

5. The method of claim 1, wherein each of said plurality of scenarios includes nodes and said extracting class, method and state transition information is performed by:

adding classes to said model that correspond to said nodes of said update set of scenarios that are not defined in said partial model;

adding invoked methods to said model that correspond to said invoked methods of said update set of scenarios that are not defined in said partial model;

adding states to said model that correspond to said states of said update set of scenarios that are not defined in said partial model; and adding state transitions to said model that correspond to the said state transitions of said update set of scenarios that are not defined in said partial model.

6. The method of claim 5, which further includes verifying whether there is a conflict between said state transition not defined in said partial model and an existing transition contained in said partial model, before said adding state transition step.

7. The method of claim 6, which further includes manually resolving said conflict.

8. The method of claim 1, wherein said loading model step, said loading plurality of scenarios step, said saving step, said producing a difference summary step and said updating step is performed continually until said model is at a proper level of maturity.

9. The method of claim 1, which further includes post processing.

10. The method of claim 9, wherein said post processing includes reconciling multiple class behaviors.

11. The method of claim 9, wherein said post processing includes editing and consistency checking.

12. The method of claim 9, wherein said post processing includes model merging.

13. The method of claim 1, which further includes generating state machine code for said updated model.

14. The method of claim 13, wherein said generating state machine code is performed automatically by code templates.

* * * * *